United States Patent
Salsbury (10) Patent No.: US 7,505,877 B2
(45) Date of Patent: Mar. 17, 2009

(54) SYSTEM AND METHOD FOR CHARACTERIZING A SYSTEM

(75) Inventor: Timothy I. Salsbury, Whitefish Bay, WI (US)

(73) Assignee: Johnson Controls Technology Company, Holland, MI (US)

(*) Notice: Subject to any disclaimer, the term of this patent is extended or adjusted under 35 U.S.C. 154(b) by 653 days.

(21) Appl. No.: 10/093,857

(22) Filed: Mar. 8, 2002

(65) Prior Publication Data

US 2003/0171901 A1 Sep. 11, 2003

(51) Int. Cl.
*G06F 17/10* (2006.01)
(52) U.S. Cl. .......................... 703/2; 700/31
(58) Field of Classification Search ........... 703/2
See application file for complete search history.

(56) References Cited

U.S. PATENT DOCUMENTS

| | | | |
|---|---|---|---|
| 4,901,918 A | 2/1990 | Grald et al. | |
| 5,276,630 A | 1/1994 | Baldwin et al. | |
| 5,394,322 A * | 2/1995 | Hansen | 700/37 |
| 5,558,274 A | 9/1996 | Ben-Aissa et al. | |
| 5,587,899 A * | 12/1996 | Ho et al. | 700/37 |
| 5,706,190 A | 1/1998 | Russ et al. | |
| 6,006,142 A | 12/1999 | Seem et al. | |
| 6,122,605 A | 9/2000 | Drees et al. | |
| 6,236,872 B1 * | 5/2001 | Diab et al. | 600/323 |
| 6,373,033 B1 * | 4/2002 | de Waard et al. | 219/497 |
| 6,408,228 B1 | 6/2002 | Seem et al. | |
| 6,424,873 B1 | 7/2002 | Przybylski | |
| 6,459,334 B2 * | 10/2002 | Wright et al. | 300/2 |
| 6,522,954 B1 | 2/2003 | Kummerer et al. | |
| 6,540,148 B1 | 4/2003 | Salsbury et al. | |
| 6,554,198 B1 | 4/2003 | Hull et al. | |
| 6,647,318 B2 | 11/2003 | Salsbury | |
| 6,697,767 B2 * | 2/2004 | Wang et al. | 702/189 |
| 6,798,843 B1 * | 9/2004 | Wright et al. | 375/296 |
| 2002/0116075 A1 | 8/2002 | Salsbury | |
| 2003/0036689 A1 * | 2/2003 | Diab et al. | 600/323 |
| 2003/0153986 A1 | 8/2003 | Salsbury et al. | |

OTHER PUBLICATIONS

MEG 421 Automatic Control, Lab #6 and 7: Proportional feedback control, Fall 2001,http://www.me.unlv.edu/Undergraduate/coursenotes/control/lab6.pdf.*

Hagglund et al., "Industrial Adaptive Controllers Based on Frequency Response Techniques", Automation, vol. 27, No. 4, pp. 599-609,1991.*

(Continued)

*Primary Examiner*—Paul L Rodriguez
*Assistant Examiner*—Russ Guill
(74) *Attorney, Agent, or Firm*—Foley & Lardner LLP (57) ABSTRACT

A method and apparatus of identifying a system is disclosed. The method comprises estimating at least one parameter in a second-order model of the system, and approximating at least one parameter in a first-order model of the system from the at least one second-order model parameter. The method may also comprise sampling an input to the system, sampling an output from the system. The apparatus comprises a device for estimating at least one parameter in a second-order model of the system, and device for approximating at least one parameter in a first-order model of the system from the at least one second-order model parameter.

49 Claims, 4 Drawing Sheets

OTHER PUBLICATIONS

"Basic Control Design and analysis with MATLAB and the Control System Toolbox 4.0", 1999.*

Lurie, "BODE Step Toolbox", 2000, http://www.luriecontrol.com/BodestepToolbox.htm.*

MIT OpenCourseWare, "Cap 15 Control Fundamentals", Fall 2000.*

Kuo, Benjamin C.; "Automatic Control Systems", 1991, Sixth Edition, Prentice-Hall, pp. 357-365.*

Huang, Hsiao-Ping et al.; "A system of procedures for identification of simple models using transient step response", 2001, Ind. and Eng. Chem. Research, 2001, vol. 40, pp. 1903-1915.*

Mamat, R. and Fleming, P.J.; "Method for on-line identification of a first-order plus dead-time process model", 1995, Electronics Letters, vol. 31, No. 15.*

O'Dwyer, A. et al.; "A classification of techniques for the estimation of the model parameters of a time delayed process", 1999, Proceedings of the Irish Signals and Systems Conference.*

O'Dwyer, A.; "Estimation of delayed process model parameters in the frequency domain", 1999, from Progress in Simulation, Modeling, Analysis and Synthesis of Modern Electrical and Electronic Devices and Systems, World Scientific and Engineering Society Press.*

O'Dwyer, Aidan; "The estimation and compensation of processes with time delays", 1996, Ph.D. thesis from Dublin City University, especially p. 36, equations 2.17 and 2.18.*

Qiang Bi et al., "Advanced controller auto-tuning and its application in HVAC systems", Jun. 2000, Control Engineering Practice, vol. 8, Issue 6, pp. 633-644.*

Qing-Guo Wang et al., "PID Tuning for Improved Performance", Jul. 1999, IEEE Transactions on Control Systems Technology, vol. 7, No. 4, pp. 457-465.*

Brian D. O. Anderson et al., "Optimal Control Linear Quadratic Methods", 1990, Prentice-Hall, pp. 289-290.*

R.E. Harrison et al., "Accuracy of Parameter Estimation by Frequency Response Analysis", 1974, Industrial & Engineering Chemistry Process Design Development, vol. 13, No. 4, pp. 389-391.*

Karl J. Astrom et al., "Adaptive Control", second edition, 1995, Addison-Wesley, pp. 2, 25, 45-52, 60-61, 283,331, 377,477.*

Benjamin C. Kuo, "Automatic Control Systems", sixth edition, 1991, Prentice-Hall, pp. 100, 181-183, 327-329, 562-568.*

L. Ljung, "Estimation focus in system identification: prefiltering, noise models, and prediction", 1999, Proceedings of the 38th Conference on Decision & Control, pp. 2810-2815.*

Al-Numay, S., D. G. Taylor, "One Cycle Averaging for Digital PWM Control System Design", Proceedings of the American Control Conference Jun. 2000, p. 1057.

Basseville, Michéle et al., "Detection of Abrupt Changes: Theory and Application", This book was previously published by Prentice-Hall, Inc., 1998.

Bernelli-Zazzera, F., P. Mantegazza, "Linearization Techniques for Pulse Width Control of Linear Systems", Control and Dynamic Systems: Advances in Theory and Applications, vol. 70, 1995, p. 67.

Bezergianna, S., C. Georgakis, 2000, "Controller Performance Assessment Based on Minimum and Open-Variance", Control Engineering Practice, vol. 8, pp. 791-797.

Cao, Songling et al., "An efficient method for on-line identification of steady state", *Journal of Process Control*, Dec. 1995, pp. 363-374, vol. 5, No. 6.

Cao, Songling et al., "Critical values for a steady-state identifier", *Journal of Process Control*, Apr. 1997, pp. 149-152, vol. 7, No. 2.

Clark, R. C., "HVACSIM+ Building Systems and Equipment Simulation Program Reference Manual", Published by the U.S. Department of Commerce, National Bureau of Standards, National Engineering Laboratory, Center for Building Technology, Building Equipment Division, Gaithersburg, MD 20899, 1985.

Desborough, L., T. Harris, 1992, "Performance Assessment Measures for Univariate Feedback Control", The Canadian Journal of Chemical Engineering, vol. 70, pp. 1186-1197.

Desborough, Lane et al., Industrial Computing, www.isa.org/journals/ic, Aug. 2001, pp. 52-55.

Energy Information Administration (EJA), "Commercial Building Energy Consumption and Expenditures 1995". DOE/EIA-0625(95), Washington, D.C., 1998.

Eriksson, P., A. J. Isaksson, 1994, "Some Aspects of Control Loop Performance Monitoring", The 3rd IEEE Conference on Control Applications, Glasgow, Scotland, pp. 1029-1034.

Forsman, Krister et al., "A new criterion for detecting oscillations in control loops", In Proc. European Control Conference, 1999, 5 pgs.

Frank, P. M., 1990, "Fault Diagnosis in Dynamic Systems Using Analytical and Knowledge-Based Redundancy—A Survey and Some New Results", Automatica, vol. 26, No. 3, pp. 459-474.

Guo, B., D. C. Lin, Y. L. Feng, K. G. D. Laknath, M. Syedulaq, M. Nakaoka, "New Conceptual Electromagnetic Induction Fluid Heating System Using Resonant PWM Inverter with Auto-Tuning PID Controller". Proceedings of the IEEE International Conference on Industrial Technology, 1996, p. 390.

Hägglund, T. and K. J. Åström, 1991, "Industrial Adaptive Controllers Based on Frequency Response Techniques", Automatica, vol. 27, pp. 599-609.

Hägglund, T., 1995, "A Control Loop Performance Monitor", Control Engineering Practice, vol. 3, pp. 1543-1551.

Hägglund, T., 1999, "Automatic Detection of Sluggish Control Loops", Control Engineering Practice, vol. 7, pp. 1505-1511.

Hägglund, T., K. Åström, 2002, "Revisiting the Ziegler-Nichols Tuning Rules for PI Control", Proceedings of the UCSB Process Control Consortium, pp. 364-380.

Harris, T. J., 1989, "Assessment of Control Loop Performance", Canadian Journal of Chemical Engineering, vol. 67, pp. 856-861.

Horch, A., 2000, "Condition Monitoring of Control Loops", Ph.D., Thesis, Royal Institute of Technology, Sweden, ISBN 91-7170-638-0, 216 pages, including cover page.

Horch, A., A. J. Isaksson, 1999, "A Modified Index for Control Performance Assessment", Journal of Process Control, vol. 9, p. 475-483.

Horch, Alexander et al., "A method for detection of stiction in control valves", *Royal Institute of Technology*, Jul. 1998, 7 pgs.

Horch, Alexander, "A simple method for detection of stiction in control valves", (Royal Institute of Technology) Source: Control Engineering Practice, Oct. 1999, pp. 1221-1231, vol. 7, No. 10.

Ingimundarson, A., T. Hägglund, 2001, "Closed Loop Identification of First-Order Plus Dead Time Model with Method of Moments", Department of Automatic Control, Lund Institute of Technology, Sweden, Internal Report, 6 pages.

Isermann, R., 1992, "Adaptive Control Systems", Published by Prentice Hall, Englewood Cliffs, NJ, pp. 307-323.

Itkis, U., "Control Systems of Variable Structure", Published by John Wiley & Sons, pp. 21-50 and 74-93, bearing a designation "Copyright © 1976."

Krishnaswamy, P. R., B. E. M. Chan, and G. P. Rangaiah, 1987, "Closed Loop Tuning of Process Control Systems", Chemical Engineering Science, vol. 42, No. 9, pp. 2173-2182.

MacGregor. J. F., T. J. Harris. 1993. "The Exponentially Weighted Moving Variance". Journal of Quality Technology. vol. 25. No. 2. pp. 106-118.

Mallinson, N., "Plug & Play Single Chip Controllers for Variable Speed Induction Motor Drives in White Goods and HVAC Systems", Proceedings of the 13th Annual Applied Power Electronics Conference, 1998 p. 756.

Marchetti, G. et al., "Identification and Control of Open-Loop Unstable Processes by Relay Methods", *Automatica*, Jun. 2001, pp. 1-6.

Miao, T., D. E. Seborg. 1999. "Automatic Detection of Excessively Oscillatory Feedback Control Loops". Proceedings of the 1999 IEEE International Conference on Control Applications. Hawaii, USA, pp. 359-364.

Montgomery, Douglas C. et al., "Some Statistical Process Control Methods for Autocorrelated Data", *Journal of Quality Technology*, Jul. 1991, pp. 179-193, vol. 23; No. 3.

Nagai, S., H. Nagura, M. Nakaoka, "High Frequency Inverter with Phase-Shifted PWM and Load Adaptive PFM Control Strategy for Industrial Induction-Heating", Proceedings of IEEE Industry Applications Conference, Canada, 1993, p. 2165.

Nash, J. C., "Compact Numerical Methods for Computers: Linear Algebra and Function Minimization", Published by Adam Hilger, Ltd, Bristol, pp. 161-164, bearing a designation "Copyright © 1979, 1980."

Nishikawa, Y., N. Sannomiya, T. Ohta, and H. Tanaka, 1984, "A Method for Autotuning of PID Controller Parameters", Automatica, vol. 20, pp. 321-332.

Paulonis, Michael A. et al., "A practical approach for large-scale controller performance assessment, diagnosis, and improvement", *Journal of Process Control*, 2003, pp. 155-168, vol. 13.

Rhinehart, R. Russell, "A CUSUM type on-line filter", *Process Control and Quality*, 1992, pp. 169-176, vol. 2.

Rhinehart, R. Russell, "A statistically based filter", *ISA Transactions*, Apr. 2002, pp. 167-175, vol. 41, No. 2.

Rhinehart, R., 1995, "A Watchdog for Controller Performance Monitoring", Proceedings of the American Controls Conference, Seattle, Washington, pp. 2239-2240.

Sagara, Setsuo et al., "Numerical Integration Approach to On-line Identification of Continuous-time Systems", *Automatica*, Jan. 1990, pp. 63-74, vol. 26, No. 1.

Salsbury, Timothy I. "A New Sequencer Controller for Multistage Systems of Known Relative Capacities", 45 pgs.

Salsbury, Timothy I., "A New Pulse Modulation Adaptive Controller (PMAC) Applied to HVAC Systems", 43 pgs.

Seem, J. E., C. Park, and J. M. House, "A new sequencing control strategy for Air-Handling Units,"International Journal of Heating, Ventilating, Air-Conditioning and Refrigerating Research, vol. 5, No. 1, Jan. 1999, pp. 35-58.

Sira-Ramirez, H. 1989, "Sliding Regimes in Pulse-Width-Modulation Systems Design", Proceedings of the 28th IEEE Conference on Decision and Control-Tampa, Florida, 1989, p. 2199-2204.

Skoog, R. A., G. L. Blankenship, "Generalized Pulse-Modulated Feedback Systems: Norms, Gains, Lipschitz Constants, and Stability", IEEE Transactions on Automatic Control. vol. AC-21, No. 5, 1976, p. 739.

Stanfelj, N., T. Marlin, J. MacGregor, 1993, "Monitoring and Diagnosing Process Control Performance: The Single Loop Case", Ind. Eng. Chem. Res., vol. 32, pp. 301-314.

Sundaresan, K. R., P. R. Krishnaswamy, 1978, "Estimation of Time Delay Time Constant Parameters in Time, Frequency, and Laplace Domains", The Canadian Journal of Chemical Engineering, vol. 56, pp. 257-262.

Swanda, A., D. E. Seborg, 1997, "Evaluating the Performance of PID-type Feedback Control Loops Using Normalized Settling Time", ADCHEM '97, IFAC, Banff, Canada, pp. 301-306.

Taiwo, O., 1993, "Comparison of Four Methods of Online Identification and Controller Tuning", IEE Proceedings, Part D, vol. 140, No. 5, pp. 323-327.

Thornhill, N. F., J. W. Cox, M. A. Paulonis, 2003, "Diagnosis of Plant-Wide Oscillation through Data-Driven Analysis and Process Understanding", Control Engineering Practice, No. 11, pp. 1481-1490.

Thornhill, N.F. et al., "Detection of Distributed Oscillations and Root-Cause Diagnosis", CHEMFAS4, believed to be available prior to the filing date of May 13, 2004, pp. 1-6.

Thornhill, N.F. et al., "Refinery-wide control loop performance assessment", *Journal of Process Control*, Apr. 1999, pp. 109-124, vol. 9, No. 2.

Tunewizard by Plant Automation Services, Inc., "Control loop optimization made simple!", http://www.tunewizard.com/ (1 of 3) [Apr. 29, 2003 9:28:38 AM], believed to be available prior to May 13, 2004, 35 total pgs.

Vachhani, Pramod et al., "A framework for integrating diagnostic knowledge with nonlinear optimization for data reconciliation and parameter estimation in dynamic systems", *Chemical Engineering Science*, 2001, pp. 2133-2148, vol. 56.

Van Varseveld, R., G. Bone, "Accurate Position Control of a Pneumatic Actuator Using On/Off Solenoid Valves", IEEE/ASME Transactions on Mechatronics, vol. 2, 1997, p. 195.

Vaught, R., J. Tippet, 2001, "Control Performance Monitoring: Shaman or Saviour", Pulp and Paper Canada, vol. 109, No. 9, pp. 26-29.

Venkataramanan, G., V. Shukla, R. Saini, R. R. Rhinehart, 1997, "An Automated On-Line Monitor of Control System Performance", American Controls Conference, Albuuquerque, New Mexico, pp. 1355-1359.

Yuwana, M. and D. E. Seborg, 1982, "A New Method for Online Controller Tuning", AIChE Journal, vol. 28, No. 3, pp. 434-440.

Zaheer-Uddin, M., G. R. Zheng, "A VAV System Model for Simulation of Energy Management Control Functions: Off Normal Operation and Duty Cycling", International Journal of Energy Conversion and Management, 1994, p. 917.

Agarwal, M., and C. Canudas, "On-line Estimation of Time Delay and Continuous-Time Process Parameters", International Journal of Control, vol. 46, No. 1, 1987, p. 295.

Q. Bi, W. Cai, E. Lee, Q. Wang, C. Hang, Y. Zhang, "Robust Identification of First-Order Plus Dead-Time Model from Step Response", Control Engineering Practice, No. 7, 1999, p. 71-77.

Bokor, E. V., Keviczky, L., "Recursive Structure, Parameter, and Delay Time Estimation using ESS Representations." Proceedings of the 7th IFAC Symposium on Identification and System Parameter Estimation and System Parameter Estimation, York, UK, 1985.

Johansson, R., "Identification of Continuous-Time Dynamic Systems", Proceedings of the 25th IEEE Conference on Decision and Control, 1986, p. 1653.

Kaminskas, V., "Parameter Estimation in Systems with Time Delay and Closed Loop Systems", 5th IFAC Symposium on Identification and System Parameter Estimation, Darmstadt, vol. 1, 1979, p. 669.

Pupeikis, R., "Recursive Estimation of the Parameters of Linear Systems with Time Delay", Proceedings of the of the 7th IFAC Symposium on Identification and System Parameter Estimation, York, UK, 1985.

Rao, G. P., L. Sivakumar, "Identification of Deterministic Time-lag Systems", IEEE Transactions on Automatic Control, vol. 21, 1976, p. 527.

Seem, J., "A New Pattern Recognition Adaptive Controller with Application to HVAC Systems", Automatica, vol. 34, No. 8, 1999, p. 969.

Söderström, T., P. Stoica., "Comparison of Some Instrumental Variable Methods—Consistency and Accuracy Aspects", Automatica, vol. 17, No. 1, 1981, p. 101.

Sundaresan, K. R., P. R. Krishnaswamy, "Estimation of Time Delay Time Constant Parameters in Time, Frequency, and Laplace Domains", The Canadian Journal of Chemical Engineering, vol. 56, 1978, p. 257.

Young, P., "Process Parameter Estimation and Self-Adaptive Control", Proceedings of the Second IFAC Symposium on the Theory of Self-Adaptive Control Systems, Teddington, England, 1965, p. 118.

Young, P., "An Instrumental Variable Method for Real-Time Identification of a Noisy Process", Automatica, vol. 6, 1970, p. 271.

Young, P., "Parameter Estimation for Continuous-Time Models—A Survey", Automatica, vol. 17, No. 1, 1981, p. 23.

\* cited by examiner

SYSTEM AND METHOD FOR CHARACTERIZING A SYSTEM

FIELD OF THE INVENTION

The present invention relates to a system and method for estimating parameters in a first-order plus time delay model using discrete samples of input-output data. More particularly, the present invention relates to a system and method for an automated testing tool that directly estimates the parameters in a second-order continuous-time model from input-output measurements.

BACKGROUND OF THE INVENTION

The three-parameter model comprising a steady-state gain, time constant, and time delay is well known in the controls industry and may form the basis of numerous tuning methods for PID controllers. The three-parameter model represents an information-efficient means of characterizing HVAC systems and also most chemical engineering processes to a reasonable degree of accuracy, even when the actual order is very high. Although the three-parameter model can be identified in heuristic ways through the application of specific test signals, an automated method of identification is desired due to the existence of multiple minima in parameter estimation cost functions formulated from input and output measurements.

Because the order of the true system is normally not known a priori, application of any type of recursive estimation scheme to the above class of systems would normally require parallel identification of multiple model candidates. An appropriate order would then need to be determined based on some cost function. In HVAC systems, computational resources on control devices are often limited due to the low-cost nature of the industry. Parallel identification of a potentially large number of models might therefore require computational storage and processing capabilities in excess of what is typically available.

One approach for identifying time delay models from input-output measurements is to estimate the parameters in several models in parallel, each model having a different time delay. However, this approach is computationally expensive and cumbersome to implement on-line, especially when the range of possible time delay values is not known very accurately beforehand. Techniques for estimating time delays in certain types of discrete-time models have been proposed but these techniques only estimate the time delay to the nearest integer multiple of the sampling period. Moreover, the problem of having multiple minima still exists when trying to estimate the time delay more accurately, i.e., when not an exact integer multiple of the sample period.

Although discrete models such as the ARMAX model are very popular and easy to implement, these models suffer from a number of deficiencies. For example, any translation from physically meaningful continuous-time system representations requires non-linear transformations, such as matrix exponentiations. The continuous-time parameters then have a non-linearly distributed relationship with the discrete parameters, making it difficult to relate changes in the estimated parameters to an original parameter of interest. In addition, fixed sampling intervals are normally required for ARMAX and other similar discrete models and the selection of a sampling rate is a critical design decision. It is known that the optimum sampling rate for control and for system identification are normally not the same. Hence, certain adaptive control methods based on discrete models suffer from sub-optimal sampling rates in either the control or identification aspect. In addition, anti-aliasing filters and other signal processing elements that are needed for robust estimation of the discrete model form end up becoming part of the estimated process model.

Accordingly, it would be advantageous to provide a system and method for characterizing a system. It would also be advantageous to adopt a "state variable filter" (SVF) method as a mechanism for directly estimating the parameters in a continuous-time model from input-output measurements. Direct estimation of continuous-time parameters offers several advantages over the discrete-time methods mentioned above. Most notably, the SVF method is less sensitive to sampling rates and is more amenable to the development of techniques for the estimation of a continuous-value time delay. The present invention demonstrates the latter advantage by developing a new transformation for obtaining the parameters in the desired first-order plus time delay characterization from parameters estimated in the continuous-time model. This approach yields near-optimal parameter estimates for given input-output data sets. The overall parameter estimation method is implemented as an automated testing tool that automatically applies step changes to the process under investigation, where the duration of each step is dynamically determined from the estimated parameters. Accordingly, it would be desirable to provide a system and method that allows systems, such as HVAC systems, to be automatically tested to validate performance, tune control loops, and configure controllers.

It would be desirable to provide for a system and method for an automated testing tool having one or more of these or other advantageous features.

SUMMARY OF THE INVENTION

The present invention relates to a method of identifying a system. The method comprises estimating at least one parameter in a second-order model of the system, and approximating at least one parameter in a first-order model of the system from the at least one second-order model parameter.

The present invention also relates to a method of analyzing a system to estimate at least one parameter in a first-order model of the system. The method comprises sampling an input to the system, sampling an output from the system, estimating at least one parameter in a second-order model of the system using the sampled inputs and outputs, and approximating the at least one first-order model parameter based on the at least one second-order model parameter.

The present invention further relates to a method of analyzing a non-first order system having inputs and outputs. The method comprises sampling the inputs, sampling the outputs, and estimating at least one parameter for a first-order model of the system based on the sampled inputs and outputs.

The present invention further relates to an apparatus for identifying a system. The apparatus comprises means for estimating at least one parameter in a second-order model of the system, and means for approximating at least one parameter in a first-order model of the system from the at least one second-order model parameter.

The present invention further relates to various features and combinations of features shown and described in the disclosed embodiments.

DETAILED DESCRIPTION OF PREFERRED AND OTHER EXEMPLARY EMBODIMENTS

According to an exemplary embodiment, an algorithm is used for estimating the parameters in a first-order plus time delay model using discrete samples of input-output data obtained from a system of interest. The algorithm comprises an indirect estimation approach whereby the parameters in a second-order continuous-time model are first estimated through the use of state variable filters. A transformation is then applied to the continuous-time parameters to obtain near-optimal estimates of the desired first-order plus dead-time parameters. High-pass filtering and instrumental variables may also be used to capture behavior within an appropriate frequency range and reduce the impact of unmeasured disturbances such as noise. Parameters may be estimated recursively, thus making the algorithm computationally undemanding and suitable for online usage in low-cost digital micro-controllers.

According to a preferred embodiment, the algorithm is implemented as an apparatus (e.g., device, system, sub-system, etc.) shown as an automatic testing tool 10 that generates its own test signals in the form of step changes to excite the system or process being characterized. According to a particularly preferred embodiment, the testing tool 10 is adapted for automating the configuration of controllers in heating, ventilating, and air-conditioning (HVAC) installations and also for verifying the performance of the controlled systems. The controllers used with HVAC systems generally require attributes to be set for proper and efficient operation, such as the sign of the process gain, sampling interval, and initial PID tuning parameters. These attributes can be determined from the parameters in the first-order plus time delay model estimated by the testing tool 10. In addition, HVAC systems may be installed incorrectly and/or insufficient time may be available for performing proper commissioning and performance verification due to the manual nature of current practice. The testing tool 10 is configured to facilitate unsupervised "self-testing" of controllers and controlled subsystems by comparing identified parameters with expectations there of during correct operation.

Figure 1:
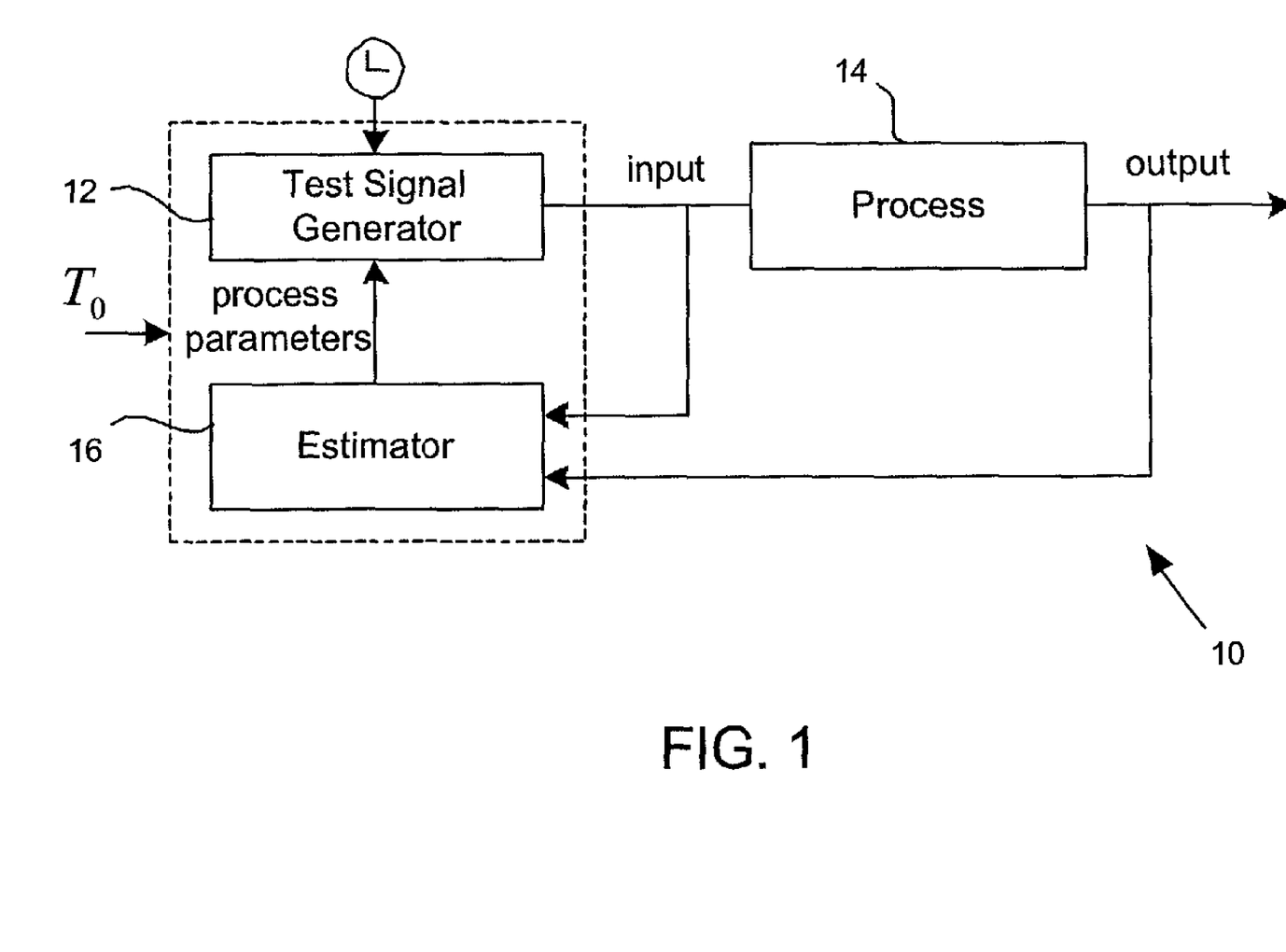
FIG. 1 is a graphical representation block diagram of an automated testing tool according to a preferred embodiment.

FIG. 1 shows components that comprise the testing tool 10 according to an exemplary embodiment. A test signal generator 12 applies step changes to an input of a process 14, and measurements of the applied input and measured output are passed to a parameter estimator 16. The parameters in a first-order plus time delay model are then estimated by estimator 16 and fed back to the test signal generator 12, where they are used as a basis for determining when to terminate the test or apply a new step change to the process 14 input. The tool 10 uses an initial estimate of the dominant time constant of the process 14 ($T_0$) to configure it for initial operation. As discussed further below, the accuracy of this initial estimate is not critical. According to a preferred embodiment, the initial value need only be greater than the actual value and can be several orders of magnitude greater without hampering the ability of the tool 10 to identify the system.

The tool 10 estimates the following parameters in a first-order plus time delay characterization: a time delay (L) estimated as a continuous value; a time constant (T) in the first-order component of the model; and a static gain (K) estimated in units dependent on the units of the measured input and output signals.

According to a preferred embodiment, the testing tool 10 is implemented in a digital controller and data are sampled discretely. The three parameters identified above are calculated at each time step in the testing process. Estimates from the tests can be used to pre-tune and configure feedback controllers, such as a proportional-integral-derivative (PID) controller, and also serve as a basis for performance validation. (According to alternative embodiments, any of a variety of controllers may be used.) The latter application can be realized by comparing estimated parameter values with expected values for the type of system being tested. Depending on the accuracy of the expected (correct operation) values, different types of faults could be detected and diagnosed.

One component of the testing tool 10 is a parameter estimation model. The model should be flexible enough to allow characterization of all possible systems within the general class of interest, but it should be simple enough to facilitate the use of robust estimation methods. In HVAC systems, for example, dynamic behavior in open loop is often the result of many elemental first-order sub-processes and components that serially affect the behavior of the overall process. An appropriate transfer function description for these sorts of systems is given by:

$$G(s) = \frac{K}{\prod_{i=1}^{N}(1+\tau_i s)} \quad (1)$$

where N is the order of the process and all roots of the characteristic equation are negative real and $\tau_1 > \tau_2 > \tau_3 > \ldots \tau_N$. The static gain is shown as a constant K, but may be a non-linear function of inputs, outputs, and time.

A model that can approximate the class of systems represented by Equation-1 is a first-order plus time delay characterization as given by:

$$G(s) = \frac{K \exp(-Ls)}{(1+Ts)} \quad (2)$$

where L is a time delay and T is a time constant. Since the exponential term expands to an infinite dimension in the s-operator, this model can be used to approximate a large range of systems of arbitrary order. Because of this flexibility, the three-parameter model described above is an exemplary way of characterizing the dynamics of a system in an information-efficient way. However, one problem with the model is that the incorporation of a time delay causes there to be multiple minima in the cost function that is needed to facilitate estimation of parameter values from input and output measurements.

To avoid the problem of local minima, an indirect method of identifying the desired first-order plus time delay model. The method involves first estimating the parameters in a second-order transfer function model as given by:

$$G(s) = \frac{b_1}{s^2 + a_1 s + a_2} \quad (3)$$

The parameters in the second-order model above are estimated in a least-squares sense from time-series input-output measurements. A transformation is then performed on the second-order model parameters to produce estimates of the parameters in the first-order plus time delay model.

Figure 2:
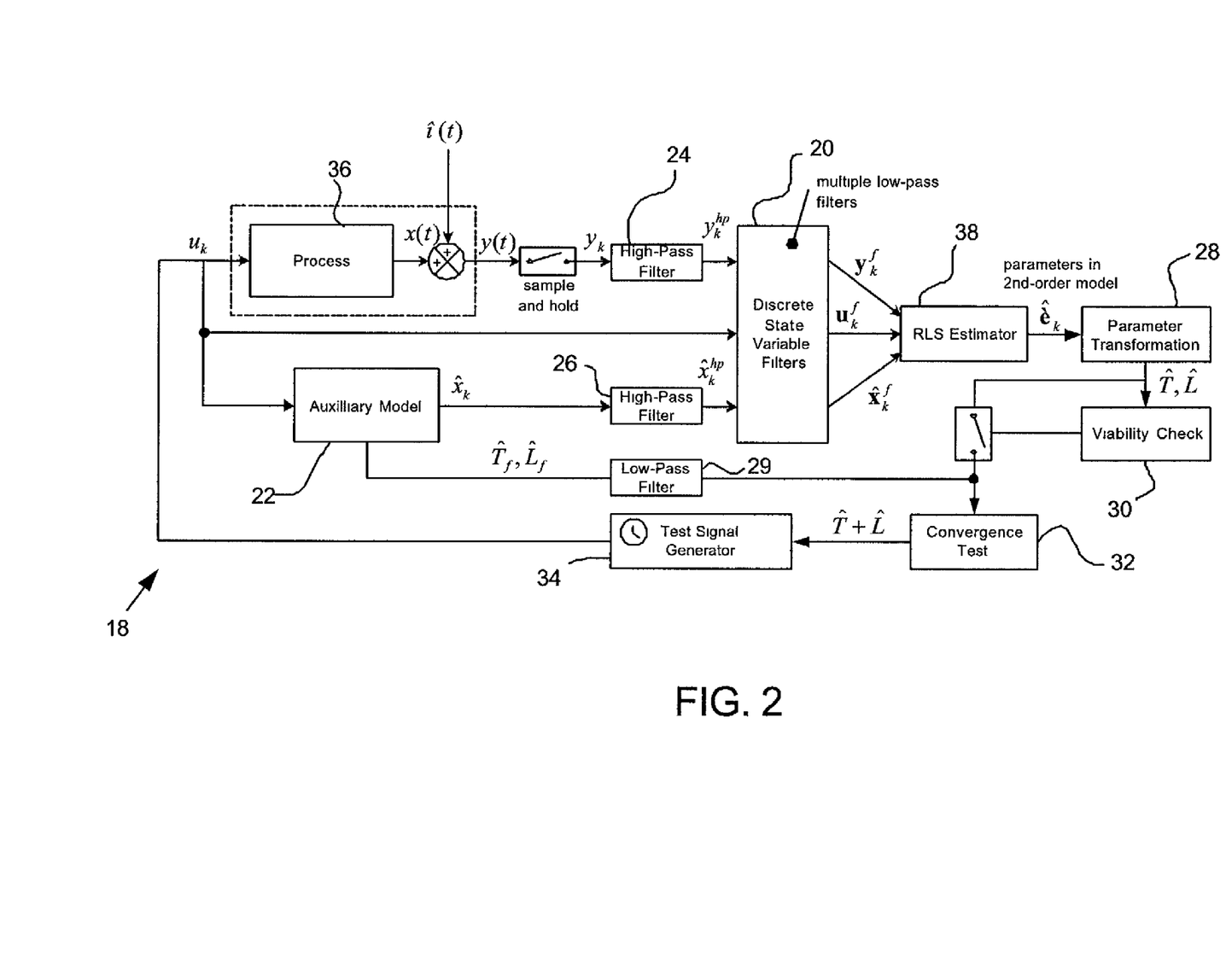
FIG. 2 is a block diagram of the automated testing tool.

FIG. 2 is a block diagram showing the main functional components in the algorithm used by an automated testing tool 18. Preferably the testing tool algorithm is implemented in a digital controller and thus constituent components operate in discrete-time where k denotes a sample number. A process 36 under investigation (e.g., being analyzed) has a continuous-time output that is sampled at discrete intervals before being processed by the algorithm. The parameter estimation is preferably made using state variable filters (SVF) 20. In addition, instrumental variables may be used in the estimation to eliminate noise-induced bias in the parameter estimates. The output of an auxiliary model 22 is passed through the SVFs 20 and the instrumental variable vector is constructed using the filtered model output. The instrumental variables and the auxiliary model 22 are described further below. The process 36 being investigated is excited by an input signal $u_k$ and produces an output signal x(t) that is corrupted by some additive signal ξ(t). The tool 18 is configured to estimate a first-order plus time delay model from the input signal and the noise-corrupted and discretely sampled output signal ($y_k$). The SVF method provides direct estimation of the parameters in a second-order transfer function by means of a transformation to a "filter operator" form, as described further below. Estimation of the transfer function parameters is preferably made using the recursive least squares (RLS) method (block 38).

High-pass filtering 24 is configured to eliminate DC-bias in the measured output signal and also focus the estimation on the frequency range of interest. A high-pass filter 26 is also applied to the output from the auxiliary model 22. (Preferably, filter 24 is substantially equivalent to filter 26.) The parameters estimated in the second-order model are passed through a transformation 28 to obtain estimates for time delay (L) and time constant (T) in a first-order plus time delay characterization. The viability of the parameter estimates are checked at block 30, after which the estimated time delay and time constant parameters are passed through a low-pass filter 29. The filtered estimates are then used as the time constants in the auxiliary model 22.

A convergence test 32 is made on the estimated parameters and upon satisfying the required criteria, the test signal generator 34 uses the parameter estimates to determine when to terminate the test or apply a new step change to the input of process 36. Signal generator 34 preferably initiates a step change when a time period has elapsed since the last step change that is greater than five times the sum of the estimated time delay and time constant (i.e., the estimated average residence time). Assuming parameter estimates are correct, this approach causes the system to be in a near steady-state condition before each new step change is applied. The parameters estimated for each step change are stored for later analysis. Each of the blocks in FIG. 2 is described in more detail in the following sections.

According to an exemplary embodiment, the second-order transfer function model is transformed into a form that enables the parameters values to be estimated using linear methods such as recursive least squares (RLS).

Ordinarily, estimation of continuous-time model parameters would require measurements of the system state vector or direct differentiation of the input and output signals. A system state vector is not normally measurable and any noise in measured signals tends to seriously disrupt attainable accuracy of any differentiation procedure.

The state variable filter method of FIG. 2 avoids the need to obtain measurement of state vectors or differentiated signals by performing a transformation on the transfer function model of interest so that it is written in terms of filtered signals available through the SVF 20. The SVF 20 is comprised of multiple first-order low-pass filters where each of the filters has the following transfer function:

$$H(s) = \frac{1}{1 + \tau s} \quad (4)$$

Re-arranging for the s operator:

$$s = \frac{1}{\tau}\left(\frac{1}{H(s)} - 1\right) \quad (5)$$

Recall that the second-order transfer function equation was given by:

$$G(s) = \frac{Y(s)}{U(s)} = \frac{b_1}{s^2 + a_1 s + a_2} \quad (6)$$

Substituting the expression for s:

$$\frac{Y(s)}{U(s)} = \frac{b_1 \tau^2 H(s) H(s)}{1 + H(s)(a_1 \tau - 2) + H(s)H(s)(1 - a_1 \tau + a_2 \tau^2)} \quad (7)$$

$$= \frac{\beta H(s) H(s)}{1 + \alpha_1 H(s) + \alpha_2 H(s) H(s)}$$

Hence, in the Laplace domain, the output Y(s) is given by:

$$Y(s) = -\alpha_1 [Y(s)H(s)] - \alpha_1 [Y(s)H(s)H(s)] + \beta_1 [U(s)H(s)H(s)] \quad (8)$$

A transformation into the time domain yields the following input-output model:

$$y(t) = -\alpha_1 y^{f1}(t) - \alpha_1 y^{f2}(t) + \beta_1 u^{f2}(t) \quad (9)$$

where $$u^{fN}(t) = L^{-1}\left(U(s)\prod_{i=1}^{N} H(s)\right) \text{ and likewise,} \quad (10)$$

$$y^{fN}(t) = L^{-1}\left(Y(s)\prod_{i=1}^{N} H(s)\right) \quad (11)$$

where $L^{-1}$ is the inverse Laplace transform. Hence, an input-output model has been formulated with parameters that are simple functions of the original transfer function parameters. In addition, the $u^{fn}$ and $y^{fn}$ elements in the model are directly realizable by simply passing the measured input and output signals through the serially-connected bank of first-order filters that comprise the SVF 20 in FIG. 2. Note that $y^{fn}$ refers to the output of the last in a series of n first-order filters where the input to the first filter in the series is the raw signal y(t). For convenience, a "filter operator" λ can be defined, such that:

$$y(t)\lambda^n = y^{fn}(t) \quad (12)$$

The above transformation can be applied to any arbitrary transfer function equation. In exemplary embodiments, this model form serves as a continuous-time analog to the discrete model form where a polynomial is defined in the shift operator, such as in ARMAX models. For example, the equation above could be expressed as:

$$A^*(\lambda)y(t) = B^*(\lambda)u(t) \quad (13)$$

where the "shift" operator is now a "filter" operator:

$$A^*(\lambda) = 1 + \alpha_1\lambda + \alpha_2\lambda^2 + \ldots + \alpha_n\lambda^n \quad (14)$$

$$B^*(\lambda) = \beta_1\lambda + \beta_2\lambda^2 + \ldots + \beta_n\lambda^n \quad (15)$$

Although the input-output model in Equation 9 was expressed in terms of continuous time, the model can also be expressed discretely as follows:

$$y_k = -\alpha_1 y_k^{f1} - \alpha_1 y_k^{f2} + \beta_1 u_k^{f2} \quad (16)$$

where the subscript k denotes sample number and the signals are discrete samples of their continuous form counterparts. Proceeding with the discrete-time form of the input-output model in the equation above, it is useful for parameter estimation purposes to express the model in the following more familiar form:

$$y_k = \theta_\tau^T \varphi_k \quad (17)$$

where $$\theta_\tau^T = [-\alpha_1 \; -\alpha_2 \; \beta_1]$$

is the parameter vector and $$\varphi_k^T = [y_k^{f1} \; y_k^{f2} \; u_k^{f2}]$$

is the regressor vector. In the more general case for an nth order transfer function:

$$\theta_\tau^T = [\, -\alpha_1 \; \ldots \; -\alpha_n \; \beta_1 \; \ldots \; \beta_n \,] \quad (18)$$

$$\varphi_k^T = [\, y_k^{f1} \; \ldots \; y_k^{fn} \; u_k^{f1} \; \ldots \; u_k^{fn} \,] \quad (19)$$

There is a linear transformation between the parameters $\alpha_1 \ldots \alpha_n, \beta_1 \ldots \beta_n$ and the original transfer function parameters $a_1 \ldots a_n, b_1 \ldots b_n$ when the SVF time constant is greater than zero. In general terms, this transformation is given by:

$$\theta_\tau = F\theta + G \quad (20)$$

where $\theta^T = [-a_1 \ldots -a_n \; b_1 \ldots b_n]$ is the parameter vector containing the transfer function parameters. F and G are given by:

$$F = \begin{bmatrix} M & 0 \\ 0 & M \end{bmatrix} \quad (21)$$

with $$M = \begin{bmatrix} m_{11} & 0 & 0 \\ \vdots & \ddots & 0 \\ m_{n1} & \ldots & m_{nn} \end{bmatrix}; \quad m_{ij} = (-1)^{i-j}\binom{n-j}{i-j}\tau^j \quad (22)$$

and $$G = [g_1 \; \ldots \; g_n \; 0 \; \ldots \; 0]; \quad g_i = \binom{n}{i}(-1)^i \quad (23)$$

The matrix F is invertible when M is invertible, which occurs for all τ>0. Since a linear transformation exists between the original transfer function parameters and the parameters in the filtered model formulation, a least-squares approach can be adopted to estimate the transfer function parameters directly from measured input-output data. As such, an output prediction $\hat{y}_k$ can be made directly from the transfer function parameter vector according to:

$$\hat{y}_k = \theta_\tau^T \varphi_k = [F\theta + G]^T \varphi_k \quad (24)$$

$$\hat{y}_k = \theta^T [F^T \varphi_k] + G^T \varphi_k$$

For a given set of measured inputs and outputs, a least squares estimate of the parameter vector can thus be found as follows:

$$\hat{y}_k = \theta^T [F^T \varphi_k] + G^T \varphi_k + e_k \quad (25)$$

$$S = \frac{1}{2}\sum_{i=1}^N e_i^2 = \frac{1}{2}\sum_{i=1}^N (y_i - \theta^T[F^T\varphi_i] - G^T\varphi_i)^2$$

$$\frac{\partial S}{\partial \theta} = \sum_{i=1}^N -[F^T\varphi_i](y_i - \theta^T[F^T\varphi_i] - G^T\varphi_i) \quad (26)$$

Hence, a least squares estimate of the parameter vector is obtained when $$\frac{\partial S}{\partial \theta} = 0,$$

thus:

$$\hat{\theta}^T = \left\{\sum_{i=1}^N \psi_i \psi_i^T\right\}^{-1} \left\{\sum_{i=1}^N \psi_i \varepsilon_i\right\} = P_N \left\{\sum_{i=1}^N \psi_i \varepsilon_i\right\} \quad (27)$$

where:

$$\psi_i = F^T\varphi_i; \; \varepsilon_i = y_i - G^T\varphi_i \quad (28)$$

Equation 27 can be written in a recursive form to yield the following familiar set of recursive least-squares (RLS) equations:

$$\hat{\theta}_k = \hat{\theta}_{k-1} + P_k \psi_k (\varepsilon_k - \psi_k \hat{\theta}_{k-1})$$ (29)
$$= \hat{\theta}_{k-1} + P_k \psi_k (y_k - [\hat{\theta}_{k-1}^T [F^T \varphi_k] + G^T \varphi_k])$$
$$= \hat{\theta}_{k-1} + P_k \psi_k e_k$$

where $e_k = y_k - \hat{y}_k$ is the prediction error at the $k^{th}$ sample. The update formula for the P matrix is given by:

$$P_k = P_{k-1} - \frac{P_{k-1} \psi_k \psi_k^T P_{k-1}}{1 + \psi_k^T P_{k-1} \psi_k}$$ (30)

The preceding equations thus provide a way to recursively update the parameters of a continuous-time transfer function equation directly from measurements of inputs and outputs sampled at discrete points in time. As discussed below, the equations may be refined to eliminate, reduce, or minimize bias in the parameter estimated stemming from noise in the measured output signal.

When there is noise in the measured output signal, this noise may be correlated in some way with the regressor vector ($\phi$). In this situation, the parameter estimates obtained through application of the basic form of the recursive least squares method detailed above will be biased to a degree dependent on the signal-to-noise ratio. Noise and other disturbances that have a zero mean over the long term can be "correlated out" of the estimation using known instrumental variable methods. Recall that the $\theta$ value that minimizes the least-squares cost function is the solution of:

$$E\phi_k[y_k - \phi_k \theta] = 0$$ (31)

The instrumental variable method involves replacing what is the gradient vector in the above expression to yield the following:

$$E\eta_k[y_k - \phi_k \theta] = 0$$ (32)

where $\eta_k$ is selected to be uncorrelated with the noise term (i.e., $\xi(t)$ in FIG. 2), but strongly correlated with a gradient vector derived from the noise-free output of the system, i.e., $x(t)$ in FIG. 2. Furthermore, the following should hold true:

$$E\eta_k \xi_k = 0$$

$E\eta_k \phi_k$ be positive definite, or at least non-singular. (33)

Introduction of an instrumental variable vector as an approximation to the actual gradient vector allows the least squares equations to be expressed as follows:

$$\hat{\theta}^T = \left\{ \sum_{i=1}^{N} \eta_i \psi_i^T \right\}^{-1} \left\{ \sum_{i=1}^{N} \eta_i \varepsilon_i \right\}$$ (34)

The recursive form of the least squares equations with the incorporation of the instrumental variable vector is then given by:

$$P_k = P_{k-1} - \frac{P_{k-1} \eta_k \psi_k^T P_{k-1}}{1 + \psi_k^T P_{k-1} \eta_k}$$ (35)
$$\hat{\theta}_k = \hat{\theta}_{k-1} + P_k \eta_k e_k$$

According to an exemplary embodiment, it is desirable that $\eta_k$ be derived from a prediction of the noise-free output of the process, i.e., $\hat{x}_k$ in FIG. 2. One way to obtain predictions of $\hat{x}_k$ is to use a model of the process that is driven by the same input. The numerator in the transfer function representation of the auxiliary model is irrelevant both from an accuracy and consistency point of view. Also, taking the denominator of the auxiliary model transfer function to be equal to that of the real system is only optimal when $\xi_k$ is in fact white noise. However, without a detailed knowledge of auto-correlation in the noise component, the denominator of the auxiliary model may be set to approximate that of the real system, which is the approach adopted in the preferred embodiment.

According to an exemplary embodiment, an auxiliary model structured to be of the same order as the estimated second-order model is used to generate the vector of instrumental variables. The auxiliary model thus has two time constants associated with it ($\tau_1$ and $\tau_2$). The numerator of model transfer function is taken to be unity since this part of the transfer function has no impact on the estimation, as was described above. Because the parameter estimation scheme is designed for implementation in a digital controller, the auxiliary model equations are solved discretely. For this purpose a discrete state-space formulation is used so that:

$$\hat{x}_{k+1} = C\hat{x}_k + du_k; \hat{x} = [\hat{x}_1 \ \hat{x}_2]$$ (36)

where $$C = \begin{bmatrix} \rho_1 & 0 \\ \{\rho_1(1-\rho_2)\} & \rho_2 \end{bmatrix}; \quad d = \begin{bmatrix} (1-\rho_1) & \{(1-\rho_1)(1-\rho_2)\} \end{bmatrix}$$ (37)

where $\rho_1 = \exp(-\Delta t/\tau_1)$ and $\rho_2 = \exp(-\Delta t/\tau_2)$. During the estimation, the time constants ($\tau_1$ and $\tau_2$) in the auxiliary model are set equal to the estimated time delay (L) and time constant (T), respectively. As such, the roots in the auxiliary model's characteristic equation will be negative and real, which is consistent with the expected form of the system being characterized. Also, a second-order model tends to provide an approximation to a first-order plus time delay process when the time constants are set equal to the desired time delay and first-order time constant. The auxiliary model output is $x_2$ and this output is passed through the state variable filters in order to generate the following instrumental variable vector:

$$\eta_k^T = \begin{bmatrix} \hat{x}_{2,k}^{f1} & \hat{x}_{2,k}^{f2} & u_k^{f2} \end{bmatrix}$$ (38)

The above vector is therefore analogous to the regressor vector, but is constructed from the output of the auxiliary model instead of the noise-corrupted measured output.

The measured output signal is passed through a high-pass filter 24 before being used in the parameter estimation to block out DC bias and eliminate extraneous disturbances that are outside the frequency range of process 36. Recall that the time constant ($\tau$) used in the state variable filters 20 is set to represent an estimate of maximum likely time constant in the process. A high-pass filter with an effective cut-off frequency may therefore be derived from the time constant, $\tau$. According to an exemplary embodiment, a first-order high-pass filter is applied to the measured output signal with a time constant set equal to $\tau$, i.e., $$G_f(s) = \frac{\tau s}{1 + \tau s} \quad (39)$$

Because the post-filtered signal is used in the parameter estimation, the parameter estimator 38 will "see" the product of the real process and filter transfer functions, i.e., $$\frac{Y^{hp}(s)}{U(s)} = G_p(s)G_f(s) \quad (40)$$

where $G_p(s)$ is the transfer function of the process being identified and the superscript hp denotes the high-pass filtered version of the measured output signal. Direct use of the filtered output signal in the estimation will thus cause the filter transfer function to become part of the estimated process model. However, this may be avoided by first expressing $G_f(s)$ in terms of the low-pass filter transfer function H(s) via substitution of the expression for the s operator that was given in Equation 5. Because the high-pass filter and SVF filters 20 use the same time constant τ, the high-pass filter transfer function simplifies to:

$$G_f\{H(s)\} = 1 - H(s) \quad (41)$$

The transfer function of the process 36 is then isolated from the estimation by applying the above expression as a multiplier in the s domain to the measured input signal used in the estimation:

$$\frac{Y^{hp}(s)}{U(s)\{1 - H(s)\}} = G_p(s) \quad (42)$$

Recall that the original regressor vector used in the estimation of the considered second-order model was given by:

$$\varphi_k^T = \begin{bmatrix} y_k^{f1} & y_k^{f2} & u_k^{f2} \end{bmatrix} \quad (43)$$

Utilization of Equation 42 thus involves simply multiplying the input signals in the regressor vector by $G_f\{H(s)\}$. Hence, since H(s) is a linear operator, the regressor vector can be re-defined as:

$$\varphi_k^T = \begin{bmatrix} (y^{hp})_k^{f1} & (h^{hp})_k^{f2} & \{u_k^{f2} - u_k^{f3}\} \end{bmatrix} \quad (44)$$

The high-pass filtering 24 implemented on the output signal is thus blocked out of the parameter estimation by substituting this new regressor vector in the equations for updating the P matrix and parameter vector. The same transformation is also performed on the vector of instrumental variables so that:

$$\eta_k^T = \begin{bmatrix} (\hat{x}_2^{hp})_k^{f1} & (\hat{x}_2^{hp})_k^{f2} & \{u_k^{f2} - u_k^{f3}\} \end{bmatrix} \quad (45)$$

where the superscript hp denotes the high-pass filtered version of the signals.

A discrete implementation of the above high-pass filter 24 can be realized as follows:

$$y_k^{hp} = \gamma(y_{k-1}^{hp}) + \gamma[y_k - y_{k-1}] \quad (46)$$

where γ=exp(−Δt/τ) is the filter constant obtained from the analytical solution of the filter transfer function. The high-pass filters 24, 26 are preferably applied to the measured output and to the auxiliary model output (respectfully).

As with the auxiliary model, the multiple first-order low-pass filters in the SVF 20 of the testing tool 18 are solved discretely to allow implementation in a digital controller. The discrete state-space model form is used again to filter the measured input (u), the high-pass filtered version of the measured output ($y^{hp}$), and the high-pass filtered version of the auxiliary model output $$(\hat{x}_2^{hp})$$

in the following manner:

$$\begin{aligned} u_{k+1}^f &= Au_k^f + Bu_k \\ y_{k+1}^f &= Ay_k^f + By_k^{hp} \\ \hat{x}_{k+1}^f &= A\hat{x}_k^f + B\hat{x}_{2,k}^{hp} \end{aligned} \quad (47)$$

where $u^f = [u^{f1} \ldots u^{fn}]$; $y^f = [y^{f1} \ldots y^{fn}]$; $\hat{x}^f = [\hat{x}^{f1} \ldots \hat{x}^{fn}]$. Vector $u^f$ thus contains the filtered inputs, the vector $y^f$ the filtered outputs, and the vector $\hat{x}^f$ the filtered auxiliary model outputs. The time constant for the filters is τ and this is used to calculate the coefficient matrix (A) and driving vector (B) as follows:

$$A = \begin{bmatrix} a_{11} & 0 & 0 \\ \vdots & \ddots & 0 \\ a_{n1} & \ldots & a_{nm} \end{bmatrix}; a_{ij} = \gamma(1-\gamma)^{i-j} \quad (48)$$

$$B = [b_1 \ldots b_n]; b_i = (1-\gamma)^i; \gamma = \exp\left(\frac{-\Delta t}{\tau}\right) \quad (49)$$

where Δt is the sampling interval. Both the regressor vector φ and the instrumental variable vector η used in the parameter estimation can now be constructed directly from the outputs of the state-space models described above.

Referring to FIG. 2, the transformation 28 is performed to obtain the desired first-order plus time delay parameters from the second-order model parameters. The parameter estimation method outlined so far allows the parameters in a second-order transfer function model to be estimated for a given data set. The recursive implementation provides for a near-optimal least-squares fit; the sub-optimality only stemming from having to initialize the P matrix to some finite value. If $P_0$ is selected to be a large multiple of the identity matrix, this initialization effect can usually be considered negligible and a least-squares estimate of the parameters can be assumed.

As explained above, the ultimate objective of the testing tool 18 is to provide parameters for a first-order plus time delay model. Hence, a further transformation is used to obtain the desired parameters from those estimated for the second-order transfer function. As outlined previously, estimation of the parameters in a true first-order plus time delay model for a given data set is typically a non-linear problem, which would require iterative methods to locate a global minimum. A number of techniques for obtaining the time delay and time constant parameters from either a process response curve or a transfer function may be used. These techniques may obviate the need for performing non-linear optimization. However, use of the techniques to transform a given transfer function to the desired first-order plus time delay form still uses iteration to obtain parameter estimates.

A transformation as provided in an exemplary embodiment avoids the need for non-linear optimization or iteration by fitting the magnitude and phase of the desired first-order plus time delay model to the second-order transfer function at the estimated natural frequency ($\omega_N$). Considering the second-order transfer function model:

$$G(s) = \frac{b}{s^2 + a_1 s + a_2}$$

the natural frequency is thus: $\omega_N = \sqrt{a_2}$. At this frequency, the magnitude and phase are respectively given by:

$$|G(j\omega_N)| = \frac{b}{a_1 \sqrt{a_2}} \quad (50)$$

$$\angle G(j\omega_N) = -\frac{\pi}{2} \quad (51)$$

The desired first-order plus time delay model is defined as:

$$G_M(s) = \frac{\exp(-Ls)}{Ts + 1} \quad (52)$$

Because the magnitude of $G_M$ is a function of the time constant and not the time delay, the time constant can be calculated by equating the magnitudes. Setting the static gain of the model $G_M$ equal to that of the second-order model thus yields:

$$\frac{b}{a_1 \sqrt{a_2}} = \frac{b/a_2}{\sqrt{1 + a_2 T^2}} \Rightarrow T = \sqrt{\frac{a_1^2}{a_2^2} - \frac{1}{a_2}} \quad (53)$$

The phase of the time delay model is given by:

$$\angle G_{M2}(j\omega_N) = -L\omega_N - \tan^{-1}(\omega_N T) \quad (54)$$

Equating the phase to that of the second-order model at the natural frequency (i.e., $\pi/2$) and substituting the expression for T thus yields:

$$L = \frac{-\tan^{-1}\left(-T\sqrt{a_2}\right) - \pi/2}{-\sqrt{a_2}} \quad (55)$$

Figure 3:
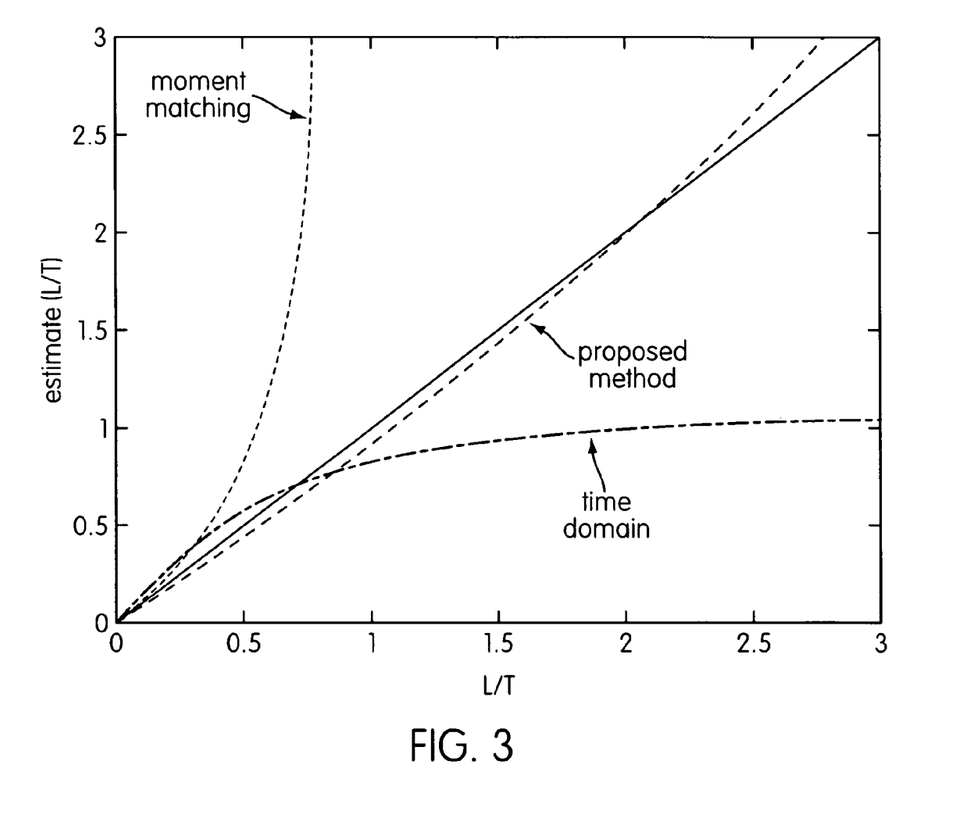
FIG. 3 is a graphical representation of linear optimized valves according to an exemplary embodiment.

To illustrate the accuracy of the proposed transformation, it may be compared with a known method of moments and also with a known method of matching points in the time domain step response. FIG. 3 shows the results from the comparison where the time delay is varied as a fraction of the time constant from zero to three. The transfer function used in the analysis is estimated from data generated from a first-order plus time delay model using the least-squares SVF estimation technique described previously. It can be observed that both the method of moments and time domain method deteriorate rapidly in accuracy when L/T gets large, e.g., above 0.5, whereas the proposed method produces accurate results throughout the considered range.

Note that L and T are only calculated when a real-valued solution is possible. The following constraints thus need to be satisfied to yield real values for L and T:

$$\frac{a_1^2}{a_2^2} > \frac{1}{a_2} \text{ AND } a_2 > 0 \quad (56)$$

An estimate of the steady-state gain (K) is obtained from the estimated second-order transfer function simply by solving for s=0, i.e., $$\hat{K} = G(0) = \frac{b_1}{a_2} \quad (57)$$

The estimate for the steady-state gain coupled with the estimates of L and T thus yield the familiar three-parameter model that forms the basis of numerous loop-tuning methods.

The estimates of L and T are evaluated for their viability (reference number 30 in FIG. 2) by ensuring the following constraints:

$$0 < \frac{L}{T} \leq 5 \text{ AND } \Delta t < L + T < T_0 \quad (58)$$

where $T_0$ is the user-supplied estimate of the maximum possible time constant that is used as the time constant in the state variable filters and in the high-pass filters. The sampling interval is $\Delta t$ and it is assumed that the ratio of time delay to time constant would not exceed 5 for all types of HVAC systems likely to be encountered in practice. The estimated time delay and time constant are passed through a low-pass filter and the filtered values of L and T are used in the auxiliary model 22 as the first and second time constants ($\tau_1$ and $\tau_2$).

For the tool 18, a simple convergence test is based on calculating the absolute change in a parameter between estimates. Convergence is then flagged when the change is below a threshold for a statistically significant number of estimates, e.g., $$\frac{1}{N} \sum_{j=1}^{N} |\theta_j - \theta_{j-1}| < C \quad (59)$$

where C is a threshold, N is preferably a statistically significant number of samples, and $\theta$ is a parameter being tested. The threshold may depend on the range of the parameter $\theta$, input signal excitation, and the dynamics of the process 36 under investigation. The dynamics of the process 36 tend to have a particular relevance in the approach utilized by the tool

18 because step changes are applied as excitation and information relevant for the estimation is accumulated in the parameter estimation at a rate determined by the open loop dynamics of the process 36. If the tool 18 were used in a closed loop, the dynamics would likely be faster than the open loop plant due to the action of a controller. Parameters converge at a rate similar to or slower than that determined by the open loop dynamics of the process 36 when applying step test signals as excitation. The dynamics of the process can be normalized out of the convergence test by assuming the parameters converge at a rate governed by a first-order dynamic equation:

$$\tau \left| \frac{d\theta(t)}{dt} \right| = \theta_{ss} - \theta(t) \tag{60}$$

where the subscript ss denotes steady-state value and $\tau$ is the overall time constant of the process. The equation provides a measure of the steady state error $\theta_{ss} - \theta(t)$, which can thus be calculated from the rate of change of the parameter estimate multiplied by the time constant of the process. The estimate can be further normalized to eliminate variations due to different ranges in the tested parameter by dividing it by the current parameter estimate to yield a relative value. Assuming approximation of the derivative with discrete samples, the normalized steady-state error (SSE) can thus be stated as:

$$SSE = \frac{\tau}{\theta_j} \left| \frac{\theta_j - \theta_{j-1}}{t_j - t_{j-1}} \right| \tag{61}$$

Because the overall time constant of the process is not known a priori, one way to avoid having to specify this parameter would be to perform the convergence test on the estimate of this parameter. For example, if $\theta = T_{ar} = L + T$, this is an estimate of the average residence time of the process and can also act as a proxy for the governing process time constant ($\tau$). Hence, $\tau$ can be set equal to $\theta_j$ in Equation 61, yielding:

$$SSE = \left| \frac{\theta_j - \theta_{j-1}}{t_j - t_{j-1}} \right| \tag{62}$$

Statistical significance can again be tested for by evaluating the SSE quantity over a significant number of samples (N), i.e., $$\frac{1}{N} \sum_{j=1}^{N} \left| \frac{\theta_j - \theta_{j-1}}{t_j - t_{j-1}} \right| < C \tag{63}$$

The threshold C can now be specified in generic terms between 0 and 1 related to the relative change in the estimate of the average residence time of the process under investigation. In this way, a threshold can be defined that is scalable across a range of different processes.

According to a preferred embodiment, the parameter estimation portion of the algorithm comprises two main parts: initialization and run-time.

In the initialization part, the algorithm is initialized through the construction of the following matrices and vectors:

$$A = \begin{bmatrix} a_{11} & 0 & 0 \\ \vdots & \ddots & 0 \\ a_{n1} & \cdots & a_{nm} \end{bmatrix}; \; a_{ij} = \gamma(1-\gamma)^{i-j} \tag{64}$$

$$B = [b_1 \ldots b_n]; \; b_1 = (1-y)^1 \tag{65}$$

$$M = \begin{bmatrix} m_{11} & 0 & 0 \\ \vdots & \ddots & 0 \\ m_{n1} & \cdots & m_{nn} \end{bmatrix}; \; m_{ij} = (-1)^{i-j} \binom{n-j}{i-j} \tau^j \tag{66}$$

$$F = \begin{bmatrix} M & 0 \\ 0 & M \end{bmatrix} \tag{67}$$

$$G = [g_1 \ldots g_n \; 0 \ldots 0]; \; g_i = \binom{n}{i}(-1)^i \tag{68}$$

where $\gamma = \exp(-\Delta t/\tau)$. The SVF time constant and high-pass filter time constant are both set equal to $T_0$, such that $\tau = T_0$. The algorithm therefore preferably has the user to set two parameters: sampling interval ($\Delta t$) and initial time constant ($T_0$).

The run-time part of the algorithm comprises the following:

1. Calculating matrices for auxiliary model:

$$C = \begin{bmatrix} \rho_1 & 0 \\ \{\rho_1(1-\rho_2)\} & \rho_2 \end{bmatrix}; \; d = \begin{bmatrix} (1-\rho_1) & \{(1-\rho_1)(1-\rho_2)\} \end{bmatrix} \tag{69}$$

2. Applying high-pass filter to measured process output:

$$y_k^{hp} = \gamma(y_{k-1}^{hp}) + \gamma[y_k - y_{k-1}] \tag{70}$$

3. Updating auxiliary model discrete state space:

$$\hat{x}_{k+1} = C\hat{x}_k + du_k; \; \hat{x} = [\hat{x}_1 \; \hat{x}_2] \tag{71}$$

4. Updating discrete state space of state variable filters:

$$u_{k+1}^f = Au_k^f + Bu_k \tag{72}$$
$$y_{k+1}^f = Ay_k^f + By_k^{hp}$$
$$\hat{x}_{k+1}^f = A\hat{x}_k^f + B\hat{x}_{2,k}^{hp}$$

5. Constructing regressor and instrumental variable vectors:

$$\varphi_k^T = \left[ (y^{hp})_k^{f1} \; (y^{hp})_k^{f2} \{u_k^{f2} - u_k^{f3}\} \right] \tag{73}$$

$$\eta_k^T = \left[ (\hat{x}_2^{hp})_k^{f1} \; (\hat{x}_2^{hp})_k^{f2} \{u_k^{f2} - u_k^{f3}\} \right] \tag{74}$$

6. Transforming regressor vector and calculating prediction error (e):

$$\psi_i = F^T \varphi_i; \quad (75)$$

$$e_k = y_k^{hp} - (\theta_{k-1}^T \psi_k + G^T \varphi_k)$$

7. Updating P matrix:

$$P_k = P_{k-1} - \frac{P_{k-1}\eta_k \psi_k^T P_{k-1}}{1 + \psi_k^T P_{k-1} \eta_k} \quad (76)$$

8. Updating second-order model parameter vector:

$$\hat{\theta}_k = \hat{\theta}_{k-1} + P_k \eta_k e_k; \text{ where } \theta^T = [-a_1 - a_2 \ b_1] \quad (77)$$

9. Calculating steady-state gain:

$$\hat{K} = \frac{b_1}{a_2} \quad (78)$$

10. Calculating time constant (T) and time delay (L):

$$\hat{T} = \sqrt{\frac{a_1^2}{a_2^2} - \frac{1}{a^2}} \quad (79)$$

$$\hat{L} = \frac{-\tan^{-1}(-\tau\sqrt{a_2}) - \pi/2}{-\sqrt{a_2}} \quad (80)$$

where $\rho_1 = \exp(-\Delta t/\tau_1)$ and $\tau_2 = \exp(-\Delta t/\tau_2)$. The time constants $\tau_1$ and $\tau_2$ are updated with low-pass filtered versions of (viable) estimated L and T values. In the beginning, the two auxiliary model time constants are derived from $T_0$, such that: $\tau_1 = T_0/2; \tau_2 = T_0/2$. When convergence has occurred, the estimated L and T values are used to determine when to terminate the test or apply a new step test.

According to a preferred embodiment, an empirical analysis of the testing tool 18 is performed to evaluate the sensitivity of the algorithm to the initial estimate of the SVF time constant and the sampling rate at which data are obtained from the test system. In the analysis, the tool 18 was configured to terminate testing after applying two step-changes to the system input. Estimates for K, L, and T were obtained by taking the average of the estimates obtained from each step test, i.e., one step 0%-100% and one step 100%-0%.

According to a preferred embodiment, the time constant value used in the SVFs should be equal to or greater than the largest time constant in the process being identified. If the value used is too small, the estimator 38 will only "see" the high-frequency parts of the response and will not be able to correctly identify the system. The initial value of the SVF time constant is preferably equal to or greater than the largest time constant in the system. An empirical evaluation of the testing tool 18 can be used to investigate the sensitivity of the method to the initial time constant estimate, as described further below.

According to an exemplary embodiment, a first-order plus time delay system may be simulated and the ability of the testing tool 18 to estimate the system parameters for different initial time constant values may be investigated. According to an exemplary embodiment, the system is configured to have a time delay of 50 seconds, a time constant of 200 seconds, and a gain of 20° F. (e.g., parameter values representative of an HVAC heating coil unit). The initial SVF time constant was varied between 1 and 64 times the average residence time (L+T) of the simulated system. The testing tool 18 was set up to apply two step test signals (0-100% and 100%-0) and the results of the estimation represented by the average of the estimates at the end of each step test are shown in Table 1. It can be seen from the table that the final estimates are quite insensitive to the initial time constant value with the parameter estimates being close to the actual values, even when the SVF time constant is many orders of magnitude higher than that of the system. When the time constant estimate is too close to the actual value of the algorithm, it may not converge due to the parameters not passing the viability test. Recall that the viability test 30 specified that the sum of L and T should be below $T_0$. Because the algorithm tended to overestimate the time constants, the parameters did not pass this test.

TABLE 1

Sensitivity of parameter estimates to initial SVF time constant

| Parameter | Time Constant (secs) | Time Delay (secs) | Static Gain (deg F.) | Initial TC estimate (secs) |
|---|---|---|---|---|
| Actual Values | 200.0 | 50.0 | 20.0 | n/a |
| Testing Tool | Fail | Fail | Fail | 250 |
| Estimates | 211.5 | 57.4 | 19.8 | 500 |
|  | 212.7 | 56.9 | 19.8 | 1000 |
|  | 212.9 | 56.9 | 19.8 | 2000 |
|  | 212.9 | 57.0 | 19.8 | 4000 |
|  | 213.3 | 56.8 | 19.9 | 8000 |
|  | 213.4 | 56.7 | 19.8 | 16000 |

Figure 4:
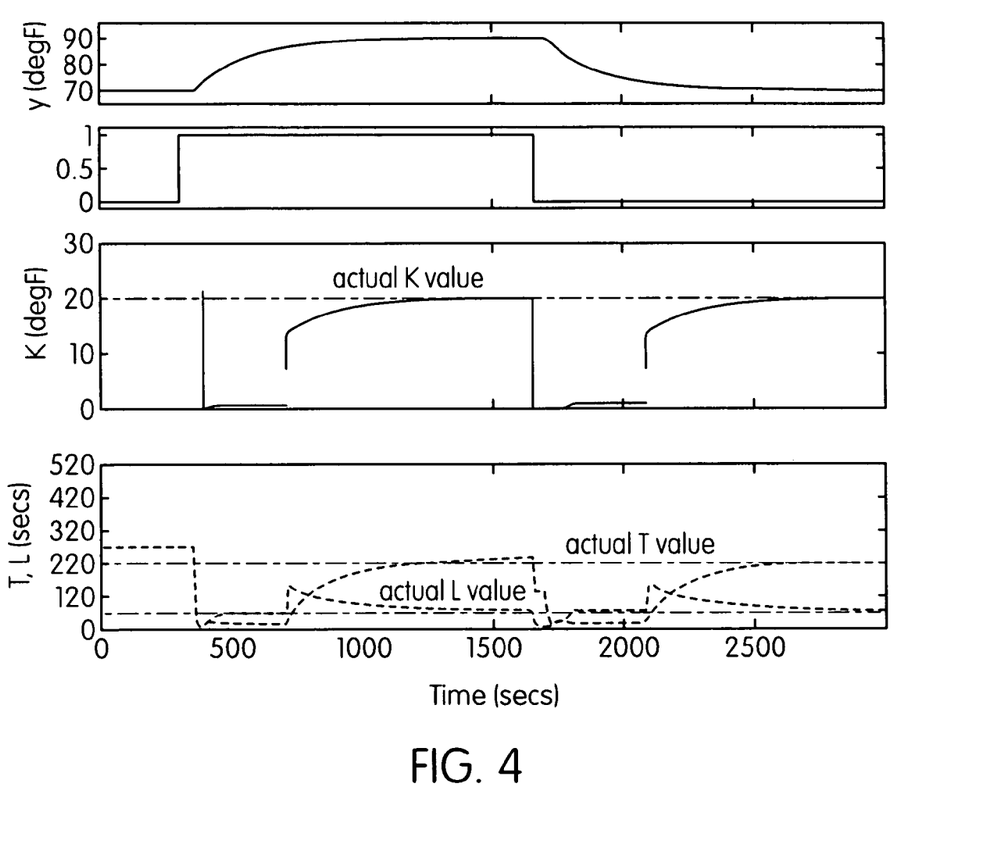
FIG. 4 is a graphical representation of linear fit to estimates from optimization according to an exemplary embodiment.

FIG. 4 shows an example result from the test when the initial SVF time constant was equal to two times the actual average residence time. The top graph in each figure shows the measured output from the simulated system and the second graph shows the applied input that was generated by the testing tool. The third graph from the top shows the estimated static gain and the bottom graph shows the estimated time constant and time delay.

One of the advantages of the continuous-time parameter estimation method over discrete-time approaches is that the state variable filters 20 can be used for interpolating between the discretely measured inputs and outputs. The method may be less sensitive to the size of sample period and can even be used with data obtained at a variable sampling rate. To determine the sensitivity of the estimation to the sampling period, the tool 18 was tested empirically with the same simulation as in the previous section over a range of data sample periods (expressed as a fraction of the system average residence time). Table 2 shows results from tests where the sample period of the data presented to the algorithm was varied between 1 and ¹⁄₆₄ the average residence time of 250 secs. In tests, the execution time step of the estimator itself was fixed at 1 second. In the test results, the method obtained estimates to a reasonable level of accuracy for sample periods that were less than ¼ the average residence time of the system. When tested at sampling intervals larger than ¼, the parameter estimates were either unreliable or the test failed to converge. The sampling rate should be fast enough to capture the dynamic characteristics of interest. In particular, the sampling period should be smaller in size than the time delay so that this parameter can be estimated.

TABLE 2

Sensitivity of parameter estimates to sample period

| Parameter | Time Constant (secs) | Time Delay (secs) | Static Gain (degF) | Ratio of sample period to Tar, i.e., $\frac{\Delta t}{T+L}$ |
|---|---|---|---|---|
| Actual Values | 200.0 | 50.0 | 20.0 | N/a |
| Testing Tool | Fail | Fail | Fail | 1 |
| Estimates | 119 | 0 | 11.8 | 1/2 |
|  | 215.6 | 47.2 | 19.9 | 1/4 |
|  | 212.2 | 49.7 | 19.8 | 1/8 |
|  | 213.3 | 59.7 | 19.8 | 1/16 |
|  | 212.6 | 59.0 | 19.9 | 1/32 |
|  | 212.9 | 55.5 | 19.8 | 1/64 |

The testing tool 18 utilizes an algorithm configured to identify a first-order plus time delay model from sampled input-output data. The algorithm is based on a state variable filter method that allows direct estimation of a second-order continuous-time transfer function. A transformation allows direct calculation of the parameters in the first-order plus time delay model from the second-order parameter values. The system and method is configured to provide near-optimal time delay and time constant estimates for a broad range of possible systems. Estimation of a three-parameter first-order plus time delay model is configured to make it possible to leverage numerous tuning methods for estimation of the parameters in PID controllers.

According to a preferred embodiment, the method is insensitive to the accuracy of initial user-defined configuration parameters: sampling interval and initial SVF time constant. The method is therefore expected to be more generically applicable than approaches based on discrete models where the sampling rate in particular can critically affect performance. The system and method could be used to characterize certain types of behavior or look for different types of faults. For example, the method could easily be used to determine static non-linearity by performing small steps through the control signal range and estimating the three parameters for each step. The variation in static gain (and also dynamic parameters) could then be used to determine non-linearity and assist in controller design, e.g., by determining a gain schedule.

The tool 18 is preferably used as a performance verification and tuning aide for HVAC systems. HVAC systems affect the comfort and health of building occupants and are responsible for a large portion of energy use in the developed world. Commissioning and performance verification of these systems is frequently inadequate due to time constraints and the manual nature of current practice. The tool 18 provides a basis on which to automate some of the testing in order to improve the commissioning process.

It is also important to note that the construction and arrangement of the elements of the system and method for an automated testing tool as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, although the proposed testing tool is implemented to generate a particular type of test signal to excite the process under investigation, the parameter estimation procedure is developed without any assumption of the type of test signal or excitation profile. The tool could therefore be adapted to operate with different types of test signal or also in a passive mode as part of an adaptive model-based control or fault detection scheme. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A method of identifying a system, the method using a controller, comprising:
    calculating an estimated value of at least one parameter in a second-order model of the system;
    calculating at least one parameter in a first-order model of the system from at least one second-order model parameter using a transformation function based on a magnitude and phase of the second-order model at a natural frequency for the second-order model, wherein said calculating is performed using the controller;
    providing the at least one first-order model parameter to a computing device; and
    using the computing device and the at least one first-order model parameter to perform at least one of pre-tuning a feedback controller, configuring the feedback controller, and reconfiguring the feedback controller.

2. The method of claim 1 wherein the second-order model is a second-order continuous time model.

3. The method of claim 2 wherein the second-order model is a second-order transfer function model or a second-order continuous-time model.

4. The method of claim 1 wherein the at least one second-order model parameter comprises at least one second-order continuous-time parameter.

5. The method of claim 1 wherein the first-order model is a first-order plus time delay model.

6. The method of claim 1 wherein the at least one first-order model parameter comprises one or more of a time delay parameter, a time constant parameter and a static gain parameter.

7. The method of claim 1 wherein the at least one second-order model parameter is calculated using sampled inputs and outputs of the system.

8. The method of claim 7 wherein the at least one second-order model parameter is calculated from the sampled inputs and outputs using a recursive least squares method.

9. The method of claim 7 wherein an output of the system is a continuous signal that is discretely sampled.

10. The method of claim 1 wherein the at least one second-order model parameter is calculated using state variable filters.

11. The method of claim 1 wherein the method is automated by a controller.

12. The method of claim 1 wherein the system is a heating, ventilation, and air-conditioning system.

13. A method of analyzing a system using a controller to calculate at least one parameter in a first-order model of the system, the method comprising:
sampling an input to the system;
sampling an output from the system;
calculating an estimated value of at least one parameter in a second-order model of the system using the sampled input and output;
calculating at least one first-order model parameter from the estimated value of the at least one second-order model parameter using a transformation function, the transformation function equating a magnitude and phase of the second-order model at a natural frequency for the second-order model with a magnitude and phase of the first-order model, wherein the steps of sampling and calculating are done using said controller; and
storing the at least one first-order model parameter.

14. The method of claim 13 wherein the second-order model is a second-order continuous-time model, and the at least one second-order model parameter comprises at least one second-order continuous-time parameter.

15. The method of claim 13 wherein the at least one first-order model parameter comprises one or more of a time delay parameter, a time constant parameter and a static gain parameter.

16. The method of claim 13 wherein the at least one second-order model parameter is calculated from the sampled input and output using a recursive least squares method.

17. The method of claim 13 wherein the at least one second-order model parameter is calculated using state variable filters.

18. The method of claim 13 wherein the at least one first-order model parameter is used to perform at least one of pre-tuning a feedback controller, configuring the feedback controller, and reconfiguring the feedback controller.

19. The method of claim 13 wherein the system is a heating, ventilation, and air-conditioning system.

20. The method of claim 13 wherein the method is automated by a controller.

21. The method of claim 13, further comprising changing an input signal to the system.

22. The method of claim 21, wherein the change in the input signal is a step change made for purposes of identifying the system.

23. The method of claim 22 wherein the change in the input signal is made during normal operation of the system.

24. The method of claim 13, further comprising: providing a step change input from a test signal generator to the system based on the at least one first-order model parameter.

25. A method of analyzing a non-first order system having inputs and outputs, the method comprising: using a controller to perform the steps of:
providing a first change to the system;
sampling the inputs;
sampling the outputs;
calculating an estimated value of at least one parameter for a second-order model of the system based on the sampled inputs and outputs;
calculating an estimated value of at least one parameter for a first-order model of the system from the estimated value of at least one parameter for a second-order model using a transformation function, the transformation function equating a magnitude and phase of the second-order model at a natural frequency for the second-order model with a magnitude and phase of the first-order model;
determining whether the estimated value of at least one parameter for a first-order model of the system is within a predetermined range;
providing a second change to the system when the estimated value of at least one parameter for a first-order model of the system is outside the predetermined range; and
storing the estimated value of at least one parameter for a first-order model of the system.

26. The method of claim 25 wherein the first-order model is a first-order plus time delay model.

27. The method of claim 25 wherein the estimated value of at least one parameter for a first-order model of the system comprises one or more of a time delay parameter, a time constant parameter and a static gain parameter.

28. The method of claim 25, wherein determining whether the estimated value of at least one parameter for a first-order model of the system is within the predetermined range comprises applying a convergence test to the estimated value of at least one parameter for a first-order model of the system.

29. The method of claim 25 wherein the second-order model is a second-order transfer function model and the estimated value of at least one parameter thereof is calculated using state variable filters.

30. The method of claim 25 wherein the sampled outputs of the system are discrete measurements of a continuous output signal of the system.

31. The method of claim 30, further comprising passing the sampled outputs through a filter.

32. The method of claim 31 wherein the filter is a high-pass filter that focuses the estimated value of at least one parameter for a first-order model of the system on a frequency range of interest.

33. The method of claim 25 further comprising passing the estimated value of at least one parameter for a first-order model of the system through a filter.

34. The method of claim 33 wherein the filter is a low-pass filter that checks the viability of the first-order model.

35. The method of claim 25 wherein the step of calculating the estimated value of at least one parameter for a first-order model of the system is implemented in a digital controller.

36. The method of claim 25 wherein the system is a heating, ventilation, and air-conditioning system.

37. An apparatus for identifying a system, the apparatus comprising:

a controller, the controller configured to:

calculate at least one parameter in a second-order model of the system and calculate at least one parameter in a first-order model of the system from the at least one parameter in a second-order model using a transformation function based on a magnitude and phase of the second-order model at a natural frequency for the second-order model;

determine whether the at least one parameter in a first-order model of the system is within a predetermined range;

provide a step change to the system when the at least one parameter in a first-order model of the system is outside the predetermined range; and store the at least one parameter in a first-order model of the system.

38. The apparatus of claim 37 wherein the second-order model is a second-order continuous-time model.

39. The apparatus of claim 37 wherein the at least one parameter in a second-order model comprises at least one second-order continuous-time parameter.

40. The apparatus of claim 37 wherein the first-order model is a first-order plus time delay model.

41. The apparatus of claim 37 wherein the at least one parameter in a first-order model of the system comprises one or more of a time delay parameter, a time constant parameter and a static gain parameter.

42. The apparatus of claim 37 wherein the second-order model is a second-order transfer function model.

43. The apparatus of claim 37, the controller further configured to sample inputs and outputs of the system, and wherein the at least one parameter in a second-order model of the system is calculated using the sampled inputs and outputs.

44. The apparatus of claim 43 wherein the at least one parameter in a second-order model of the system is calculated from the sampled inputs and outputs using a recursive least squares method.

45. The apparatus of claim 43 wherein an output of the system is a continuous signal that is discretely sampled.

46. The apparatus of claim 37 wherein the at least one parameter in a second-order model of the system is calculated using state variable filters.

47. The apparatus of claim 37 wherein the at least one parameter in a first-order model of the system is used for at least one of pre-tuning a feedback controller, configuring the feedback controller, and reconfiguring the feedback controller.

48. The apparatus of claim 37, wherein the controller runs a program configured to calculate the at least one parameter in a second-order model of the system and calculate the at least one parameter in a first-order model of the system from the at least one parameter in a second-order model using the transformation function.

49. The apparatus of claim 37 wherein the system is a heating, ventilation, and air-conditioning system.

* * * * *